(12) United States Patent
Sakamoto

(10) Patent No.: US 7,633,207 B2
(45) Date of Patent: Dec. 15, 2009

(54) ULTRASONIC MOTOR

(75) Inventor: Tetsuyuki Sakamoto, Hachioji (JP)

(73) Assignee: Olympus Corporation, Tokyo (JP)

( * ) Notice: Subject to any disclaimer, the term of this patent is extended or adjusted under 35 U.S.C. 154(b) by 6 days.

(21) Appl. No.: 12/167,319

(22) Filed: Jul. 3, 2008

(65) Prior Publication Data
US 2009/0009029 A1 Jan. 8, 2009

(30) Foreign Application Priority Data
Jul. 6, 2007 (JP) .............................. 2007-178982

(51) Int. Cl.
*H02N 2/00* (2006.01)
(52) U.S. Cl. .............................. 310/323.09; 310/323.01; 310/328
(58) Field of Classification Search ............ 310/323.01, 310/323.02, 323.08, 323.09, 323.16–323.18, 310/328
See application file for complete search history.

(56) References Cited

U.S. PATENT DOCUMENTS

| 6,211,603 | B1 | 4/2001 | Iino et al. |
| 7,019,437 | B2* | 3/2006 | Ouyang et al. .......... 310/323.08 |
| 7,250,707 | B2* | 7/2007 | Okamoto ..................... 310/328 |
| 2008/0174206 | A1* | 7/2008 | Sakamoto .............. 310/323.09 |
| 2008/0303384 | A1* | 12/2008 | Sakamoto ................... 310/334 |

FOREIGN PATENT DOCUMENTS

JP 10-327589 12/1998

* cited by examiner

*Primary Examiner*—Thomas M Dougherty
(74) *Attorney, Agent, or Firm*—Scully, Scott, Murphy & Presser, P.C.

(57) ABSTRACT

An ultrasonic motor comprises an ultrasonic vibrator having a piezoelectric stack, a press member which is securely connected in the vicinity of a node of a standing wave in the ultrasonic vibrator and which presses the ultrasonic vibrator, a driven member which is driven by frictional force between the driven member and the ultrasonic vibrator, and a case to which the press member is fixed. Here, the press member has holes, and the case has guide pins which engage with the holes provided in the press member. Further, the press member is fixed to the case in a state bent in a press direction.

6 Claims, 3 Drawing Sheets

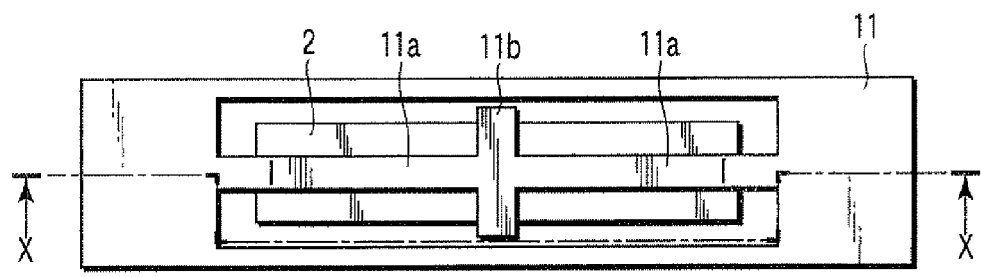
FIG. 7
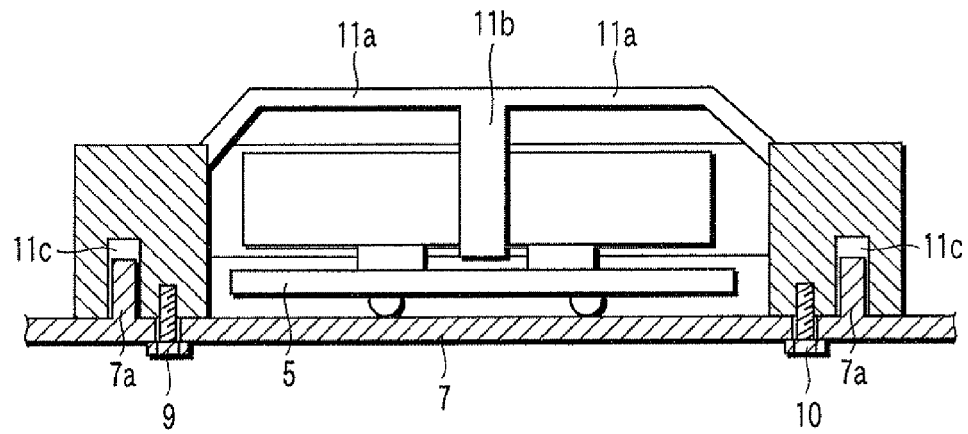
FIG. 8
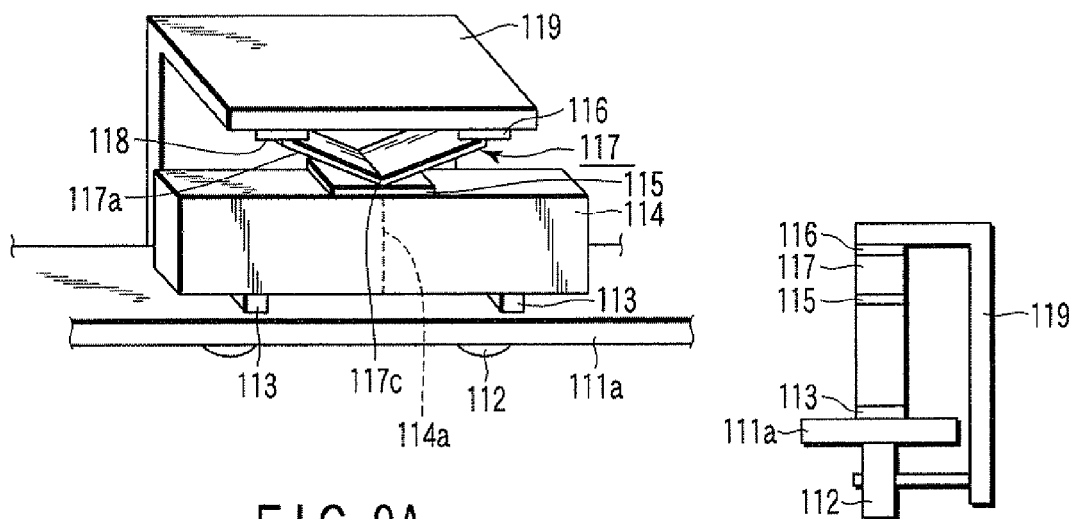
FIG. 9A
FIG. 9B

ULTRASONIC MOTOR

CROSS-REFERENCE TO RELATED APPLICATIONS

This application is based upon and claims the benefit of priority from prior Japanese Patent Application No. 2007-178982, filed Jul. 6, 2007, the entire contents of which are incorporated herein by reference.

BACKGROUND OF THE INVENTION

1. Field of the Invention

The present invention relates to an ultrasonic motor.

2. Description of the Related Art

At present, ultrasonic motors having smaller sizes, higher torque, longer strokes and higher resolution than electromagnetic motors are coming into wider use.

Incidentally, the ultrasonic motor is a motor which drives a driven body using frictional force generated between an ultrasonic vibrator and the driven body by pressing the ultrasonic vibrator against the driven body. Further, as a press mechanism for pressing the ultrasonic vibrator against the driven body, there has been disclosed, for example, a press mechanism shown in FIG. 9A and FIG. 9B of Jpn. Pat. Appln. KOKAI Publication No. 10-327589.

In other words, disclosed in Jpn. Pat. Appln. KOKAI Publication No. 10-327589 is an ultrasonic driver comprising: a vibrator 114 as a periodic vibration member; a projection 113 fixed at the lower part of the vibrator 114; a rail 111a as a movable member of the present invention to be in contact with the projection 113; a rotary member 112 which in contact with the lower surface of the rail 111a and which guides the rail 111a; a spring member 117 as a joint support pressure member of the present invention to be in contact with the upper surface of the vibrator 114; and rubber sheets 115, 116, 118 disposed between the spring member 117 and the vibrator 114 and between the spring member 117 and a fixed plate 119.

More specifically, the spring member 117 is a leaf spring which is composed of a flat plate portion 117a and a flat plate portion 117b and which is V-shaped in section. Further, in a two-way branch portion 117c branching into the flat plate portion 117a and the flat plate portion 117b, the spring member 117 is fixed at the position of a node of a standing wave in the vibrator 114 via the rubber sheet 115. In the same manner, the flat plate portions 117a, 117b are in contact with one surface of the fixed plate 119 opposite to the vibrator 114 via the rubber sheets 118, 116, respectively.

In the ultrasonic vibrator disclosed in Jpn. Pat. Appln. KOKAI Publication No. 10-327589, press force to press the vibrator 114 against the rail 111a is generated using bending reaction force of the spring member 117 according to the configuration described above.

BRIEF SUMMARY OF THE INVENTION

An ultrasonic motor according to a first aspect of the present invention comprises: an ultrasonic vibrator having a piezoelectric element; a press member which is securely connected in the vicinity of a node of a standing wave in the ultrasonic vibrator and which presses the ultrasonic vibrator; a driven member which is driven by frictional force between the driven member and the ultrasonic vibrator; and a case to which the press member is fixed, wherein the press member has holes, and the case has projections which engage with the holes provided in the press member, and the press member is fixed to the case in a state bent in a press direction.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 7 is a top view of an ultrasonic motor according to a fourth embodiment of the present invention;

FIG. 8 is a schematic sectional view showing the configuration of an ultrasonic motor according to the fourth embodiment of the present invention;

FIG. 9A is a diagram showing a conventional press mechanism for pressing an ultrasonic vibrator against a driven member; and FIG. 9B is a diagram showing the conventional press mechanism for pressing the ultrasonic vibrator against the driven member.

DETAILED DESCRIPTION OF THE INVENTION

An ultrasonic motor according to embodiments of the present invention will hereinafter be described with reference to the drawings.

First Embodiment

Figure 1:
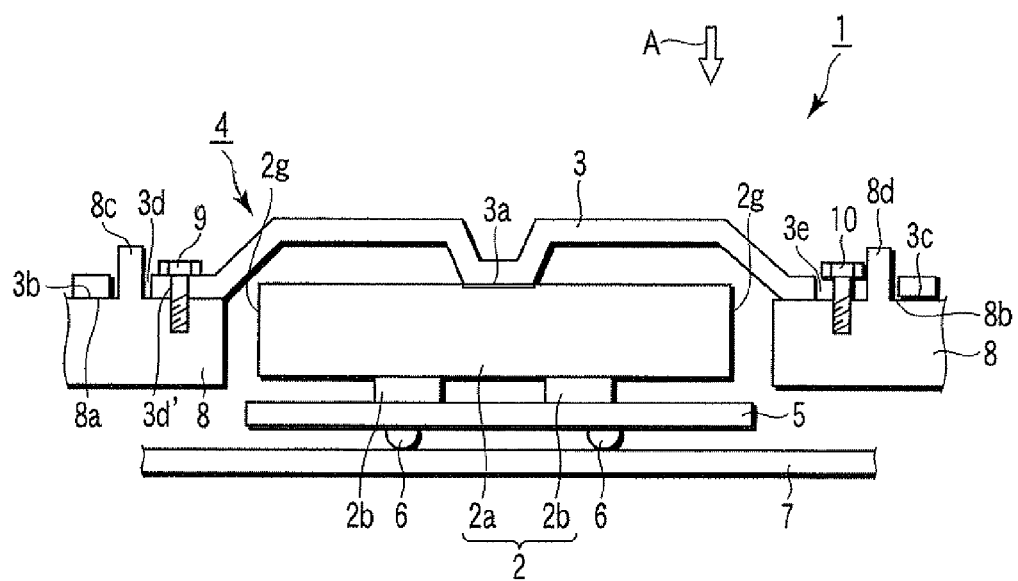
FIG. 1 is a schematic sectional view showing the configuration of an ultrasonic motor according to a first embodiment of the present invention.

FIG. 1 is a schematic sectional view showing the configuration of an ultrasonic motor according to a first embodiment of the present invention. As shown in FIG. 1, an ultrasonic motor 1 according to the present first embodiment comprises an ultrasonic vibrator 2, a driven member 5 which is in contact with the ultrasonic vibrator 2 and which is driven relative to the ultrasonic vibrator 2, rolling members 6 disposed between the driven member 5 and a case 7, the cases 7, 8 of the ultrasonic motor 1, and a press mechanism 4 which presses the ultrasonic vibrator 2 against the driven member 5. In addition, although described later in detail, the press mechanism 4 includes a press member 3 and fixing screws 9, 10.

The ultrasonic vibrator 2 has a rectangular parallelepiped piezoelectric stack 2a formed of a plurality of stacked members in which a sheet-shaped internal electrode is provided on one side of a piezoelectric ceramics sheet in the shape of a rectangular plate, and two frictional contacts (hereinafter referred to as drivers) 2b which are adhesively bonded to one side of the piezoelectric stack 2a and which are placed in close contact with the driven member 5.

Figure 2:
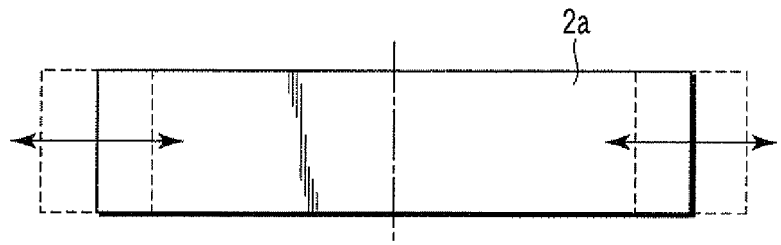
FIG. 2 is a diagram showing the longitudinal vibration of a piezoelectric stack.
Figure 3:
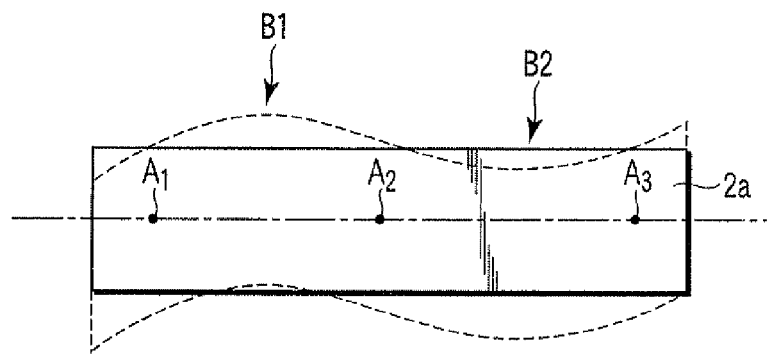
FIG. 3 is a diagram showing the flexural vibration of the piezoelectric stack.

In the piezoelectric stack 2a, an alternating voltage of a predetermined pattern is applied to the internal electrodes, such that longitudinal vibration shown in FIG. 2 and secondary flexural vibration shown in FIG. 3 are excited. In particular, the secondary flexural vibration has nodes A1, A2, A3 of a standing wave of the vibration at three places at longitudinal intervals relative to the piezoelectric stack 2a as shown in FIG. 3. Further, an antinode B1 of the standing wave of the vibration is formed between the node A1 and the node A2, and an antinode B2 of the standing wave of the vibration is formed between the node A2 and the node A3.

Here, the driver 2b is formed into a rectangular parallelepiped block shape, and is fixed by, for example, an adhesive at positions corresponding to the antinodes B1, B2 of the secondary flexural vibration in the ultrasonic vibrator 2.

The rolling member 6 is spherically formed, and is held in an interposed state so that it is embedded and fitted into, for example, a groove provided in a surface of the driven member 5 opposite to the case 7. Here, the position to dispose the driven member 5 in the movement direction is regulated by, for example, a retainer (not shown). Owing to such a configuration, the driven member 5 can be driven relative to the ultrasonic vibrator 2 and the case 7.

Incidentally, the ultrasonic vibrator 2 is securely connected by, for example, an adhesive to a central portion 3a in the press member 3 as shown in FIG. 1 at a position corresponding to the node B2 which is a common node of the standing wave in the longitudinal vibration and the standing wave in the flexural vibration of the ultrasonic vibrator 2 mentioned above.

This press member 3 is a leaf spring manufactured by, for example, stainless steel for springs. Here, the central portion 3a of the press member 3 securely connected to the ultrasonic vibrator 2 is manufactured into such a shape as to project in a press direction beyond a plane formed by connecting flat portions at both ends (one end 3b, the other end 3c) of the press member 3.

Furthermore, circular holes 3d, 3d' are provided at one end 3b of the press member 3. Moreover, a long hole 3e is provided at the other end 3c of the press member 3.

On the other hand, the case 8 has a space which can contain the ultrasonic vibrator 2 and the driven member 5 therein as shown in FIG. 1, and is longitudinally shaped relative to the ultrasonic vibrator 2 so that it is in longitudinal proximity to both end surfaces 2g of the ultrasonic vibrator 2.

Furthermore, in the vicinity of portions proximate to the both end surfaces 2g, the case 8 has surface portions 8a, 8b parallel with a surface in which the ultrasonic vibrator 2 and the press member 3 are securely connected to each other. Columnar guide pins 8c, 8d are formed in the surface portions 8a, 8b, respectively.

Figure 4:
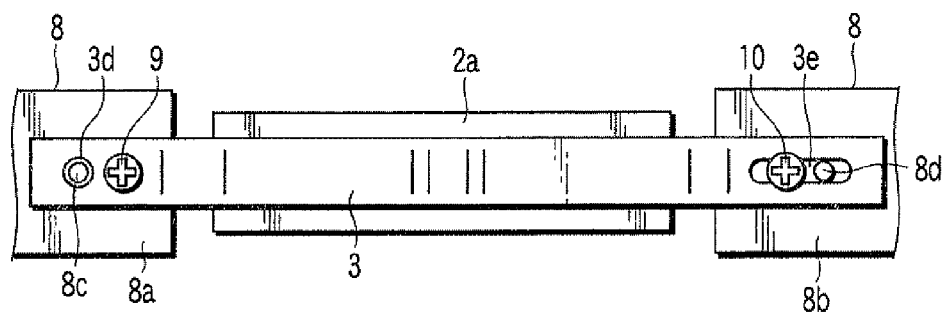
FIG. 4 is a top view of the ultrasonic motor according to the first embodiment of the present invention.

FIG. 4 is a top view of the press member 3, the ultrasonic vibrator 2 and the case 8 from the direction of an arrow A indicated in FIG. 1. As shown, the press member 3 is disposed so that its one end 3b is opposite to the surface portion 8a of the case 8 and so that the other end 3c is opposite to the surface portion 8b of the case 8.

Furthermore, the guide pin 8c formed in the case 8 is inserted and fitted into the circular hole 3d provided in the press member 3, such that the press member 3 is positioned longitudinally. Then, the guide pin 8d formed in the case 8 is inserted into the long hole 3e provided in the press member 3, such that the press member 3 is positioned in a rotation direction around the central axis of the circular hole 3d.

Here, the press member 3 is fastened and fixed to the case 8 by the two fixing screws 9, 10. At this point, the fixing screw 9 penetrates the circular hole 3d' provided in the press member 3 and is then screwed into a screw hole provided in the case 8. On the other hand, the fixing screw 10 penetrates the long hole 3e provided in the press member 3 and is then screwed into a screw hole provided in the case 8.

One example of a method of setting the ultrasonic motor according to the present first embodiment is explained below. It is to be noted that the ultrasonic vibrator 2 is previously fixed to the central portion 3a of the press member 3 by, for example, an adhesive. At this point, the press member 3 and the ultrasonic vibrator 2 can be easily positioned relative to each other, for example, by using the circular hole 3d and the long hole 3e provided in the press member 3 as guides for an adhesive bonding jig.

First, the case 7 is fastened and fixed to the case 8 by the fixing screws, etc. Then, the retainer (not shown; e.g., a brass thin plate through which circular holes are made as sphere holding holes) is mounted on the upper surface of a groove portion provided in this case 7, and the rolling members 6 are mounted in the holding hole of the retainer (not shown).

Subsequently, the driven member 5 is mounted so that the rolling members 6 are buried in a guide groove (not shown) provided in the driven member 5.

Then, the ultrasonic vibrator 2 securely connected to the press member 3 in advance as described above is mounted so that the drivers 2b and the driven member 5 contact each other. At this point, the guide pins 8c, 8d formed in the case 8 are respectively inserted into the circular hole 3d and the long hole 3e provided in the press member 3, thereby easily achieving positioning and arrangement.

In addition, the shape of the press member 3 is designed to have predetermined intervals between both ends (one end 3b, the other end 3c) of the press member 3 and the surface portions 8a, 8b of the case 8 when the ultrasonic vibrator 2 is placed as described above.

After the steps described above, the press member 3 is fastened and fixed by the fixing screws 9, 10 so that both ends (one end 3b, the other end 3c) of the press member contact the surface portions 8a, 8b of the case 8, respectively.

At this point, both ends (one end 3b, the other end 3c) bend in such a manner as to displace to the degree of a predetermined clearance on the central portion 3a of the press member 3. Further, predetermined press force is generated by this bending, and this press force acts on a position corresponding to the position of a node of a standing wave in the ultrasonic vibrator 2, thus generating an action to press the ultrasonic vibrator 2 against the driven member 5.

In addition, as the press member 3 bends and deforms, a longitudinal distance between both ends (one end 3b, the other end 3c) of the press member 3 changes and slightly reduced, but a hole through which the guide pin 8d formed in the case 8 and the fixing screw 10 penetrate serves as the long hole 3e, so that the longitudinal expansion and contraction of the press member 3 are not disturbed.

As described above, according to the present first embodiment, it is possible to provide an ultrasonic motor in which the press member for pressing the vibrator can be easily set.

More specifically, the following effects can be obtained by the ultrasonic motor according to the present first embodiment.

First, the ultrasonic motor 1 according to the present first embodiment can be set by sequentially mounting the cases 7, 8, the rolling members 6, the driven member 5, the ultrasonic vibrator 2 and the press member 3 in this order from one direction as described above (an improvement in ease of assembly). Further, when press force is generated, predetermined press force can be obtained simply by tightening the two fixing screws 9, 10.

Furthermore, the press member 3 is previously adhesively fixed to the ultrasonic vibrator 2, and the press member 3 and the case 8 function to position, support and press the ultrasonic vibrator 2. In other words, these functions are achieved by a small number of components.

Meanwhile, when the ultrasonic vibrator 2 is vibrated to frictionally drive the driven member 5, frictional reaction force which drives the ultrasonic vibrator 2 in a direction opposite to the driving direction of the driven member 5 is naturally exerted on the ultrasonic vibrator 2 from the driven member 5.

Here, in the ultrasonic driver disclosed in Jpn. Pat. Appln. KOKAI Publication No. 10-327589, the spring member 117 is held and interposed between the fixed plate 119 and the vibrator 114 via the rubber sheets 115, 116, 118 which are elastic members. The problem with this configuration is that the position of the vibrator 114 is shifted by the elastic deformation of the rubber sheet 115 provided between the vibrator 114 and the spring member 117 and by the elastic deformation of the rubber sheets 116, 118 provided between the fixed plate 119 and the spring member 117 due to frictional reaction force caused when the rail 111a which is a driven body is driven.

Moreover, this problem is critical particularly when slight displacement of the vibrator 114 is an obstacle in the case where the rail 111a which is the driven body is driven, for example, several μm to several nm, that is, in the case where the rail 111a which is the driven body is minutely driven.

On the other hand, according to the present first embodiment, such a problem does not occur since the press member 3 and the ultrasonic vibrator 2 are adhesively fixed to each other as described above and the press member 3 is further fastened to the case 8 by the fixing screws 9, 10.

In addition, according to the present first embodiment, the press member 3 is designed to have a dimension (height dimension) in its press direction smaller than its longitudinal dimension. Thus, the press member 3 has high longitudinal rigidity, and is therefore shaped so that it may bend in the press direction but may not be displaced longitudinally. Consequently, the above-mentioned problem of displacement during driving is not caused.

Moreover, while the case 7 and the case 8 are fastened and fixed to each other by, for example, screws in the present first embodiment, these may be integrally molded. When these are integrally molded, the ultrasonic motor according to the present first embodiment can be realized by a smaller number of components.

Furthermore, while the press member 3 and the ultrasonic vibrator 2 are fixed to each other by an adhesive in the present first embodiment, they do not necessarily have to be fixed by the adhesive. For example, a part of the ultrasonic vibrator 2 to be securely connected to the press member 3 may be provided with an electrode for soldering and a part of the press member 3 to be securely connected to the ultrasonic vibrator 2 may be plated with solder so that the press member 3 and the ultrasonic vibrator 2 are securely connected to each other by soldering. When they are securely connected by soldering, higher rigidity of the press member 3 can be obtained than when the adhesive is used.

Still further, the shape of the rolling member 6 is not limited to the spherical shape. For example, the rolling member 6 may be a columnar member and disposed so that its central axis is perpendicular to the movement direction of the driven member 5. Such a configuration makes it possible to obtain an advantage that the rotation of the driven member 5 around the axis in the movement direction can be regulated.

In addition, the driver 2b is made of a composite resin material wherein 20 to 30 wt % of potassium titanate fillers are filled with the base of, for example, polyphenylene sulfide (PPS) which is a heat-resisting thermoplastic resin and wherein carbon fiber and polytetrafluoroethylene (PTFE) are also mixed.

Moreover, the driven member 5 is made of, for example, magnesium silicate ($2MgO \cdot SiO2$) containing iron therein, and is lap-polished so that the surface roughness of a surface contacting the driver 2b may be Ra 0.2 μm or less.

Then, for example, the height of the driver 2b is 0.7 mm or less from the end face of the piezoelectric stack 2a in order to ensure that the vibration of the piezoelectric stack 2a is transmitted to the driven member 5 without being attenuated. In addition, this height is preferably 0.4 mm.

Second Embodiment

An ultrasonic motor according to a second embodiment of the present invention will next be explained. It is to be noted that explanations overlapping those of the ultrasonic motor according to the first embodiment described above are omitted, and an explanation is made to focus on the difference between the ultrasonic motor according to the present second embodiment and the ultrasonic motor according to the first embodiment.

Figure 5:
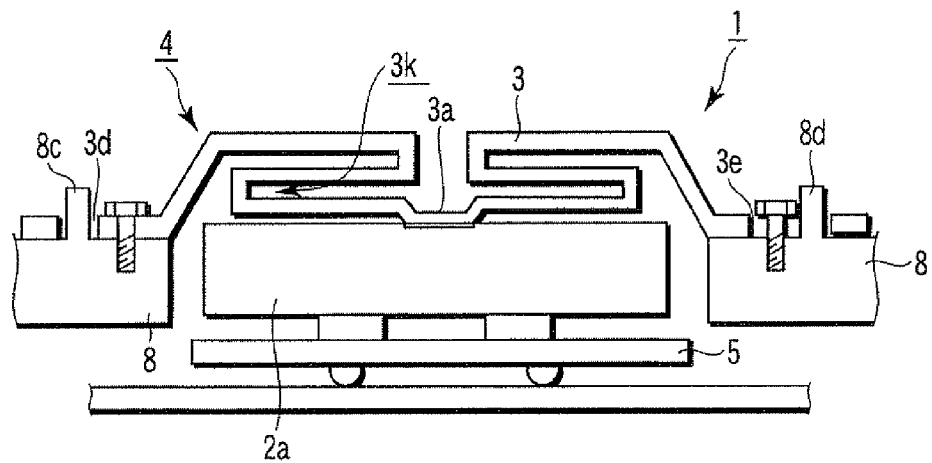
FIG. 5 is a schematic sectional view showing the configuration of an ultrasonic motor according to a second embodiment of the present invention.

FIG. 5 is a schematic sectional view showing the configuration of the ultrasonic motor according to the second embodiment of the present invention. As shown, an ultrasonic motor 1 according to the present second embodiment is different from that in the first embodiment in the configuration of a press member 3.

In other words, in the present second embodiment, the press member 3 has a flexural structure 3k presenting a flexural shape in its press direction. Owing to this flexural structure 3k, rigidity of the press member 3 in the press direction can be lower than in the first embodiment. In other words, the spring constant of the press member 3 in the press direction can be lower.

As described above, according to the present second embodiment, it is possible to provide an ultrasonic motor which produces effects similar to those of the ultrasonic motor according to the first embodiment and in which the variation of press force generated by the press member 3 corresponding to a bending degree during assembly is small.

Specifically, according to the ultrasonic motor of the present second embodiment, the influence of the variations of a case 8, a driven member 5 and other members in the press direction can be reduced, so that characteristic variations can be kept down.

In addition, in the ultrasonic motor according to the second embodiment as well, the press member 3 is shaped to have high longitudinal rigidity similar to that of the ultrasonic motor according to the first embodiment. Therefore, according to the ultrasonic motor of the present second embodiment as well, the above-mentioned problem of displacement during driving is not caused as in the ultrasonic motor according to the first embodiment.

Third Embodiment

An ultrasonic motor according to a third embodiment of the present invention will next be explained. It is to be noted that explanations overlapping those of the ultrasonic motor according to the first embodiment described above are omitted, and an explanation is made to focus on the difference between the ultrasonic motor according to the present third embodiment and the ultrasonic motor according to the first embodiment.

Figure 6:
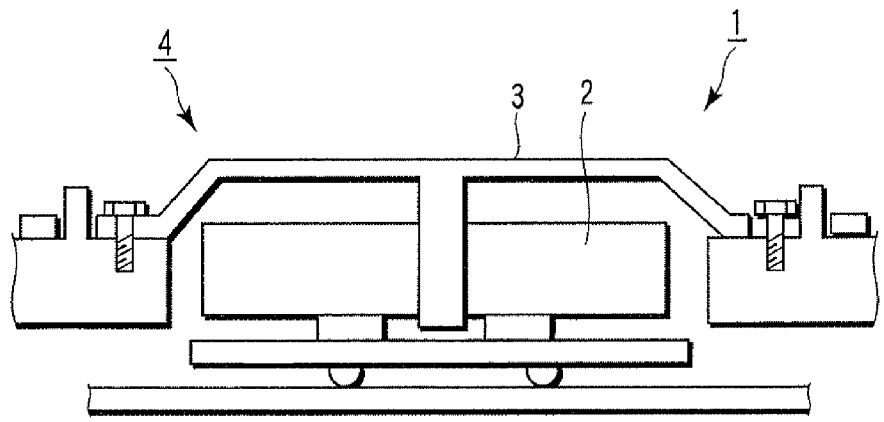
FIG. 6 is a schematic sectional view showing the configuration of an ultrasonic motor according to a third embodiment of the present invention.

FIG. 6 is a schematic sectional view showing the configuration of the ultrasonic motor according to the third embodiment of the present invention. As shown, an ultrasonic motor 1 according to the present third embodiment is different from that in the first embodiment in the configurations of a press member 3 and an ultrasonic vibrator 2.

In other words, in the present third embodiment, the press member 3 is configured as a resin member in which the ultrasonic vibrator 2 is insert-molded.

Specifically, as shown in FIG. 6, the central portion of the press member 3 is in a hollow rectangular shape (hereinafter referred to as a hollow portion), and the press member 3 is molded so that the ultrasonic vibrator 2 is contained in the hollow portion at the position of a node B2 of a standing wave in the ultrasonic vibrator 2.

Here, in the ultrasonic motor according to the present third embodiment, press force is generated by the bending reaction force of the press member 3 which is a resin member.

As described above, according to the present third embodiment, it is possible to provide an ultrasonic motor which produces effects similar to those of the ultrasonic motor according to the first embodiment and which further reduces operation steps in setting and manufacturing costs since the step of securely connecting the press member 3 to the ultrasonic vibrator 2 can be omitted.

Fourth Embodiment

An ultrasonic motor according to a fourth embodiment of the present invention will next be explained. It is to be noted that explanations overlapping those of the ultrasonic motor according to the first embodiment described above are omitted, and an explanation is made to focus on the difference between the ultrasonic motor according to the present fourth embodiment and the ultrasonic motor according to the first embodiment.

FIG. 7 is a top view of the ultrasonic motor according to the fourth embodiment of the present invention. FIG. 8 is a sectional view X-X of the ultrasonic motor shown in FIG. 7.

In the present fourth embodiment, a case 11 is in the shape of a box surrounding an ultrasonic vibrator 2. Further, the case 11 has an arm 11a linking an upper surface portion longitudinally. As in the third embodiment, in the center of the arm 11a, the case 11 has a holding portion 11b in which the ultrasonic vibrator 2 is insert-molded so that the position of a node B2 of a standing wave in the ultrasonic vibrator 2 is contained.

Furthermore, two holes 11c are provided on the bottom surface side of the case 11, so that a case 7 and the case 11 may be fastened to each other by the fixing screws 9, 10 penetrating through these holes 11c.

A method of setting the ultrasonic motor according to the present fourth embodiment is explained below.

First, the case 11 in which the ultrasonic vibrator 2 is insert-molded is placed with its upper surface side (side to be in contact with the case 7) down on, for example, a jig which receives the case 11 in contact with its flat surface except for the arm 11a. Then, the driven member 5 is mounted so that it may be in contact with a driver 2b in the ultrasonic vibrator 2.

Incidentally, the driven member 5 has a groove (not shown) in the other surface which is a surface opposite to one surface to be in contact with the driver 2b, as described in the first embodiment. Then, rolling members 6 are embedded and fitted into this groove (not shown).

Subsequently, the case 7 is set to the case 11. Here, projections 7a in the case 7 are inserted into the holes 11c provided in the case 11, and the position of the case 7 is guided.

Furthermore, a predetermined clearance is configured to be produced in a surface where the case 7 and the case 11 face each other, and when the case 7 is fastened to the case 11 by the fixing screws 9, 10, the arm 11a bends so that the case 7 and the case 11 are in contact with and fixed to each other.

Here, the case 11 presents a box shape, and has high rigidity around the holes 11c which also function as portions to be fastened to the case 7, particularly as guide portions. Therefore, even when the arm 11a bends, no displacement is caused in the fastening portions.

Furthermore, the arm 11a has high longitudinal rigidity. Thus, even when it is subjected to reaction force by the driven member 5 due to the vibration of the ultrasonic vibrator 2, the ultrasonic vibrator 2 is not longitudinally displaced.

As described above, according to the present fourth embodiment, it is possible to provide an ultrasonic motor which produces effects similar to those of the ultrasonic motor according to the first embodiment and which can be configured with a smaller number of components and which is easily set (assembly is easy) but does not cause the above-mentioned displacement during driving.

As described above, according to the first to fourth embodiments, it is possible to provide a press mechanism and an ultrasonic motor wherein a mechanism for pressing an ultrasonic vibrator in the ultrasonic motor is configured with a small number of components and in which assembly is simple. Moreover, accurate driving of a driven member obtained by the first to fourth embodiments is highly effective in obtaining a stable driving amount, for example, in the case where the driven member is driven several nm to several µm.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An ultrasonic motor comprising:
   an ultrasonic vibrator having a piezoelectric element;
   a press member which is securely connected in the vicinity of a node of a standing wave in the ultrasonic vibrator and which presses the ultrasonic vibrator;
   a driven member which is driven by frictional force between the driven member and the ultrasonic vibrator; and
   a case to which the press member is fixed,
   wherein the press member has holes, and the case has projections which engage with the holes provided in the press member, and
   the press member is fixed to the case in a state bent in a press direction.

2. The ultrasonic motor according to claim 1, wherein the press member has the two holes, and one of the holes is in the shape of a long hole.

3. The ultrasonic motor according to claim 1, wherein the press member has a flexural structure presenting a flexural shape in the press direction.

4. The ultrasonic motor according to claim 2, wherein the press member has a flexural structure presenting a flexural shape in the press direction.

5. The ultrasonic motor according to claim 1, wherein the press member is molded integrally with the ultrasonic vibrator in such a manner as to contain or hold the vicinity of the node of the standing wave in the ultrasonic vibrator.

6. The ultrasonic motor according to claim 2, wherein the press member is molded integrally with the ultrasonic vibrator in such a manner as to contain or hold the vicinity of the node of the standing wave in the ultrasonic vibrator.

* * * * *